March 24, 1953

G. SWINNERTON 2,632,337

CABLE RELEASE MECHANISM FOR CAMERAS

Filed Aug. 8, 1950

INVENTOR.
GERALD SWINNERTON
BY
E. M. Harrington
ATTORNEY

Patented Mar. 24, 1953

2,632,337

UNITED STATES PATENT OFFICE 2,632,337

CABLE RELEASE MECHANISM FOR CAMERAS

Gerald Swinnerton, St. Louis, Mo., assignor to National Camera Works, St. Louis, Mo., a co-partnership Application August 8, 1950, Serial No. 178,263

2 Claims. (Cl. 74—502)

This invention relates generally to release mechanisms for cameras and more specifically to the flexible type of release mechanism known as a cable release, the predominant object of the invention being to provide a cable release which is of such improved construction and arrangement that the manufacture of the cable release is simplified and the efficiency and durability thereof is increased.

Figure 2:
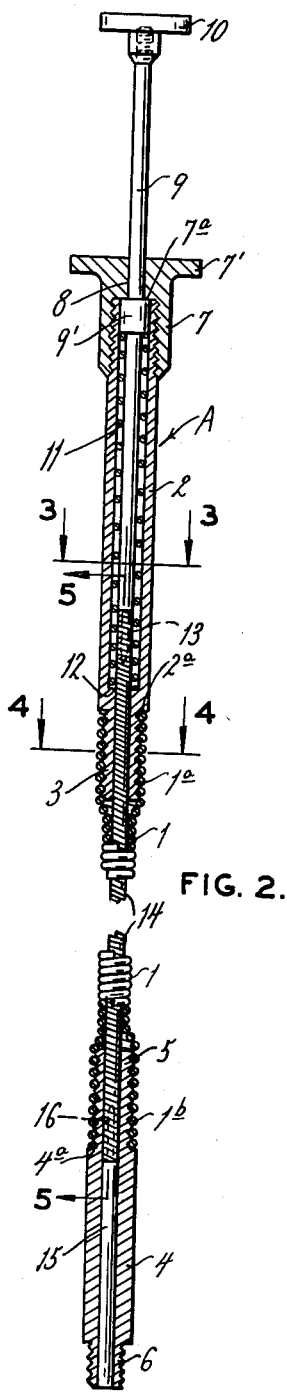
Fig. 2 is an enlarged, fragmentary, longitudinal sectional view of the cable release mechanism shown in Fig. 1.
Figure 1:
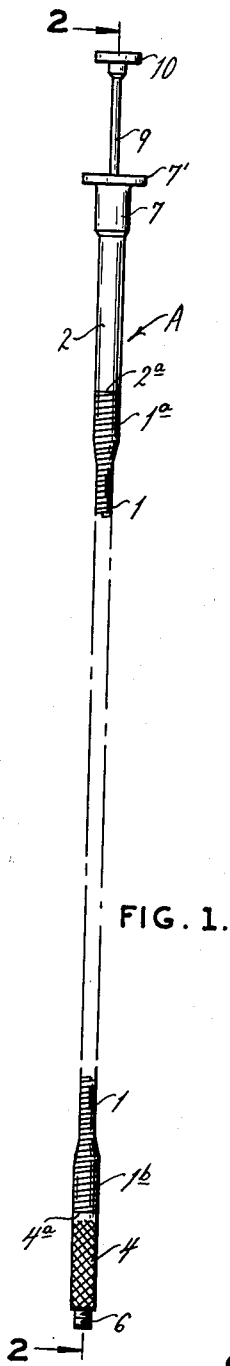
Fig. 1 is a fragmentary elevational view of the improved cable release mechanism of this invention.
Figure 3:
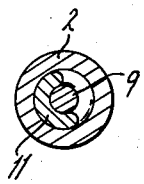
Fig. 3 is an enlarged cross-section taken on line 3—3 of Fig. 2.
Figure 4:
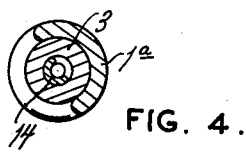
Fig. 4 is an enlarged cross-section taken on line 4—4 of Fig. 2.

In the drawing, wherein is shown for purposes of illustration, merely, one embodiment of the invention, A designates the improved cable release mechanism generally. The cable release mechanism A comprises an outer cable 1 which is in the general form of a coil spring the turns of which contact with each other, there being provided at one end of the outer cable 1 a portion 1a which is of increased diameter, and at the opposite end thereof a similar portion 1b of increased diameter. At one end of the outer cable 1 an upper sleeve 2 is provided, this upper sleeve having a stem 3 at one end thereof which is of reduced diameter relative to the main body portion of the upper sleeve and said stem is externally screwthreaded. The upper sleeve 2 is attached to the outer cable 1 and said attachment is attained by screwing the screwthreaded stem 3 of said upper sleeve into the enlarged portion 1a of the outer cable 1 until the outermost coil of said outer cable abuts against the shoulder 2a of the upper sleeve 2, as is shown in Fig. 2. At the opposite end of the outer cable 1 a lower sleeve 4 is provided which has extended from one end thereof a stem 5 that is similar to the stem 3 of the upper sleeve 2 in that it is of reduced diameter relative to the body portion of the lower sleeve and is externally screwthreaded. The lower sleeve 4 is attached to the outer cable 1 by screwing the stem 5 thereof into the enlarged portion 1b of said outer cable until the outermost coil of said outer cable 1 abuts against the shoulder 4a of the lower sleeve 4, as is shown in Fig. 2. The lower sleeve 4 at its opposite end is provided with a second screwthreaded stem 6 which serves as a means for attaching the cable release mechanism to a camera for use therewith.

Figure 5:
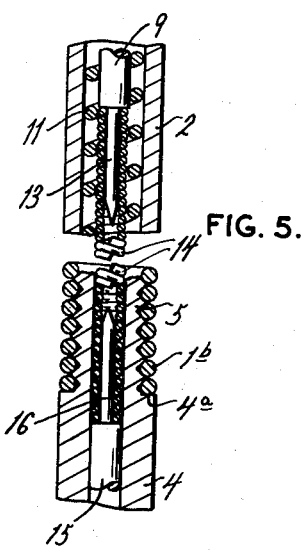
Fig. 5 is an enlarged, fragmentary longitudinal section taken on line 5—5 of Fig. 2.

The upper sleeve 2 is externally screwthreaded at its outer end, and screwthreadedly mounted on said screwthreaded portion is a pull button 7 which is provided with an annular flange 7'. The pull button 7 is provided with an opening 8 through which a push pin 9 is extended, said push pin having a push button 10 mounted thereon at the outer end thereof and being guided for longitudinal movement by the wall of the opening 8 of said pull button 7. The push pin 9 is provided with an enlarged portion 9' whose upper face normally abuts against a face 7a within the pull button 7, there being a return coil spring 11 which embraces a portion of said push pin 9 and one end of said coil spring contacts with the lower face of the enlarged portion 9' of the push pin 9 while the opposite end of said coil spring contacts with an annular shoulder 12 located within the upper sleeve 2. At the end thereof that is located within the upper sleeve 2 the push pin 9 is provided with a stem 13 which is of reduced diameter when compared with the body portion of said push pin, and preferably said stem is tapered at its outer end, as is shown to good advantage in Fig. 5.

The cable release mechanism of this invention includes an inner, flexible cable 14 which is made in accordance with the outer cable 1, as previously explained herein, and one end of said inner cable is attached to the push pin 9, such attachment being accomplished by screwing the upper end of the spirally formed inner cable onto the stem 13 of said push pin, preferably the stem 13 is smooth but because of the relative diameters of the stem 13 and the opening through the inner cable, the stem being slightly oversize, the attachment of these parts is very secure. The cable release mechanism A includes a plunger 15 which normally is disposed within the lower sleeve 4, and said plunger is provided with a stem 16 similar to the stem 13 of the push pin 9. The lower end portion of the inner cable 14 is secured to the plunger 15 in the same manner that the upper end portion of said inner cable is secured to the push pin 9; that is to say said lower portion of said inner cable is screwed onto said stem 16 of said plunger. Here, also, the stem 16 is slightly oversize relative to the discretion of the opening through the inner cable and as a result of this arrangement the attachment between said parts is rendered very secure.

The cable release of the present invention functions as did flexible cable releases of the same general type heretofore employed, such operation being well known to persons familiar with the art to which this invention relates. The important difference between the structure of this invention and these earlier cable releases is in the manner of securing the outer and inner cables of the structure of the present invention to other parts of the structure by screwing said outer and inner cables to said other parts of the structure. By so attaching the outer and inner cables to other parts of the structure a very secure structure is provided which is much more durable than the insecure crimped or soldered arrangements heretofore employed.

I claim:

1. A cable release mechanism for a camera comprising a flexible outer cable of spiral formation the coils of which contact one with another to provide a substantially closed enclosing sheath, elements at the opposite ends of said outer cable to which said outer cable is attached, said elements at opposite ends of said outer cable being provided with screwthreaded portions on which opposite end portions of said outer cable are spirally threaded, an inner cable of spiral formation which is disposed within said outer cable and is movable longitudinally with respect thereto, and elements at the opposite ends of said inner cable having smooth stems to which said inner cable is attached by being spirally threaded thereon said stems being of slightly greater diameter than the inner diameter of said inner cable.

2. A cable release mechanism for a camera comprising a flexible outer cable of spiral formation the coils of which contact one with another to provide a substantially closed enclosing sheath, elements at the opposite ends of said outer cable to which said outer cable is attached, said elements at opposite ends of said outer cable being provided with spirally grooved portions on which opposite end portions of said outer cable are spirally threaded, an inner cable of spiral formation which is disposed within said outer cable and is movable longitudinally with respect thereto, and elements at the opposite ends of said inner cable having smooth stems provided with tapered outer end portions to which said inner cable is attached by being spirally threaded thereon, said stems being of slightly greater diameter than the inner diameter of said inner cable said elements at the opposite ends of said inner cable comprising a push pin to which one end of said inner cable is attached and a plunger to which the opposite end of said inner cable is attached.

GERALD SWINNERTON.

REFERENCES CITED

The following references are of record in the file of this patent:

UNITED STATES PATENTS

| Number | Name | Date |
|---|---|---|
| 852,523 | Anderson | Oct. 2, 1906 |
| 1,314,867 | Gray | Sept. 2, 1919 |
| 1,454,192 | Sturgis | May 8, 1923 |
| 1,723,986 | Wallace | Aug. 6, 1929 |
| 1,959,692 | Sneed | May 22, 1934 |
| 2,205,648 | Fischer | June 25, 1940 |
| 2,257,098 | Arens | Sept. 3, 1941 |